US009609147B2

United States Patent
Asai

(10) Patent No.: US 9,609,147 B2
(45) Date of Patent: Mar. 28, 2017

(54) NON-TRANSITORY COMPUTER-READABLE STORAGE MEDIUM STORING COMPUTER PROGRAM FOR INFORMATION PROCESSING DEVICE, INFORMATION PROCESSING DEVICE, AND METHOD FOR CONTROLLING INFORMATION PROCESSING DEVICE

(71) Applicant: BROTHER KOGYO KABUSHIKI KAISHA, Nagoya, Aichi (JP)

(72) Inventor: Norihiko Asai, Tajimi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 14/725,049

(22) Filed: May 29, 2015

(65) Prior Publication Data

US 2015/0350462 A1    Dec. 3, 2015

(30) Foreign Application Priority Data

May 30, 2014   (JP) .................................. 2014-113134

(51) Int. Cl.
*H04N 1/00* (2006.01)
*G06F 3/12* (2006.01)
(Continued)

(52) U.S. Cl.
CPC ....... *H04N 1/00103* (2013.01); *G06F 3/1203* (2013.01); *G06F 3/1236* (2013.01);
(Continued)

(58) Field of Classification Search
None
See application file for complete search history.

(56) References Cited

U.S. PATENT DOCUMENTS

2005/0018236 A1    1/2005 Shirai et al.
2013/0034023 A1*   2/2013 Jung ..................... H04L 67/104
                                              370/255
(Continued)

FOREIGN PATENT DOCUMENTS

JP        2005-044080 A    2/2005

*Primary Examiner* — Beniyam Menberu
(74) *Attorney, Agent, or Firm* — Scully, Scott, Murphy & Presser, P.C.

(57) ABSTRACT

An information processing device may receive first communication device identification information for identifying a first communication device that can be communicated using a first wireless communication interface. The information processing device may receive second communication device identification information for identifying a second communication device that can be communicated using a second wireless communication interface. The information processing device may display, on a display unit, a first image indicating the first communication device. The information processing device may display a second image indicating the second communication device identified by the received second communication device identification information. The displaying of the second image may be performed only in a case that particular information has not been received. The particular information may indicate that the second communication device identified by the received second communication device identification information can be communicated using the first wireless communication interface.

20 Claims, 11 Drawing Sheets

(51) Int. Cl.
  *G06K 15/02*   (2006.01)
  *G06F 3/14*    (2006.01)
(52) U.S. Cl.
  CPC ....... *G06F 3/1292* (2013.01); *H04N 1/00204* (2013.01); *H04N 1/00891* (2013.01); *H04N 2201/0043* (2013.01); *H04N 2201/0055* (2013.01); *H04N 2201/0094* (2013.01)

(56) References Cited

U.S. PATENT DOCUMENTS

| | | | | |
|---|---|---|---|---|
| 2013/0065627 A1* | 3/2013 | Jung | ................... | H04W 76/023 455/515 |
| 2013/0148149 A1* | 6/2013 | Park | ...................... | G06F 3/1296 358/1.13 |
| 2013/0148161 A1* | 6/2013 | Park | ...................... | G06F 3/1296 358/1.15 |
| 2013/0148162 A1* | 6/2013 | Park | ...................... | G06F 3/1296 358/1.15 |
| 2013/0148545 A1* | 6/2013 | Jung | ..................... | H04W 48/16 370/255 |
| 2014/0118776 A1* | 5/2014 | Lee | ....................... | G06F 3/1204 358/1.15 |
| 2014/0157135 A1* | 6/2014 | Lee | ....................... | G06F 3/0482 715/738 |
| 2014/0181943 A1* | 6/2014 | Arashin | ................ | H04W 12/06 726/7 |
| 2014/0192681 A1* | 7/2014 | Hong | .................... | H04W 8/005 370/254 |
| 2014/0373123 A1* | 12/2014 | Kang | ...................... | H04L 41/22 726/7 |
| 2015/0082427 A1* | 3/2015 | Ivanchykhin | ........... | H04L 63/08 726/22 |
| 2016/0066247 A1* | 3/2016 | Villasenor | ............ | H04W 40/14 370/338 |

\* cited by examiner

FIG. 6

| | Model Name | Default Device Type | IP Address | SSID | Device ID | MAC Address |
|---|---|---|---|---|---|---|
| 611 Photo Printing | Ink-MFP1 | Wi-Fi Default Device | 211.9.36.148 | SSID-1 | ABCDE | O—O—O—O—O—O |
| 612 Web Printing | Laser-1 | WFD Default Device | 211.9.36.154 | SSID-1 | EFGHI | ×—×—×—×—×—× |
| 613 Scan | Scan-1 | Wi-Fi Default Device | 211.9.36.132 | SSID-1 | JKELM | △—△—△—△—△—△ |

801 802 803 804 805 806

TB1

NON-TRANSITORY COMPUTER-READABLE STORAGE MEDIUM STORING COMPUTER PROGRAM FOR INFORMATION PROCESSING DEVICE, INFORMATION PROCESSING DEVICE, AND METHOD FOR CONTROLLING INFORMATION PROCESSING DEVICE

CROSS-REFERENCE TO RELATED APPLICATIONS

This application claims priority to Japanese Patent Application No. 2014-113134, filed on May 30, 2014, the contents of which are hereby incorporated by reference into the present application.

TECHNICAL FIELD

The technology disclosed in this specification relates to an information processing apparatus or the like for communicating with devices.

DESCRIPTION OF RELATED ART

Conventionally, a user installs a driver into a personal computer (referred to as PC) or other such information processing apparatus, selects default printer, and stores the default printer IP address in the PC. When the user instructs the PC to print, the PC uses the stored IP address to send the print data to the default printer. Technology for performing data communications between an information processing apparatus and a device such as a printer like this is known.

SUMMARY

However, when the information processing apparatus is provided with two or more types of communication interfaces, there are cases where it is possible to communicate with a default device using a plurality of communication paths. In cases like this, user-friendliness may be lost when information related to the default device is not properly displayed.

One technique disclosed in the present application is a non-transitory computer-readable storage medium storing a computer program for an information processing device configured to communicate with a plurality of devices. The information processing device may comprise: a first wireless communication interface configured for communication in accordance with a first communication standard; a second wireless communication interface configured for communication in accordance with a second communication standard that is different from the first communication standard; a storage; a display unit; an operation unit; and one or more processors. The computer program may include instructions for causing the one or more processors of the information processing device to perform receiving, via the first wireless communication interface, first communication device identification information for identifying a first communication device that can be communicated using the first wireless communication interface. The computer program may cause the one or more processors to perform receiving, via the second wireless communication interface, second communication device identification information for identifying a second communication device that can be communicated using the second wireless communication interface. The computer program may cause the one or more processors to perform displaying, on the display unit, a first image indicating the first communication device identified by the received first communication device identification information. The computer program may cause the one or more processors to perform displaying, on the display unit, a second image indicating the second communication device identified by the received second communication device identification information. The displaying of the second image may be performed only in a case that particular information has not been received. The particular information may indicate that the second communication device identified by the received second communication device identification information can be communicated using the first wireless communication interface. The computer program may cause the one or more processors to perform accepting, via the operation unit, an operation for selecting the first image displayed on the display unit. The computer program may cause the one or more processors to perform registering, in the storage, the first communication device corresponding to the selected first image as a communication target device. The computer program may cause the one or more processors to perform accepting, via the operation unit, an operation for selecting the second image displayed on the display unit. The computer program may cause the one or more processors to perform registering, in the storage, the second communication device corresponding to the selected second image as the communication target device.

BRIEF DESCRIPTION OF DRAWINGS

FIG. 6 is a diagram showing an example of a default device table TB1;

EMBODIMENT

<First Embodiment><Configuration of Network 10>

Figure 1:
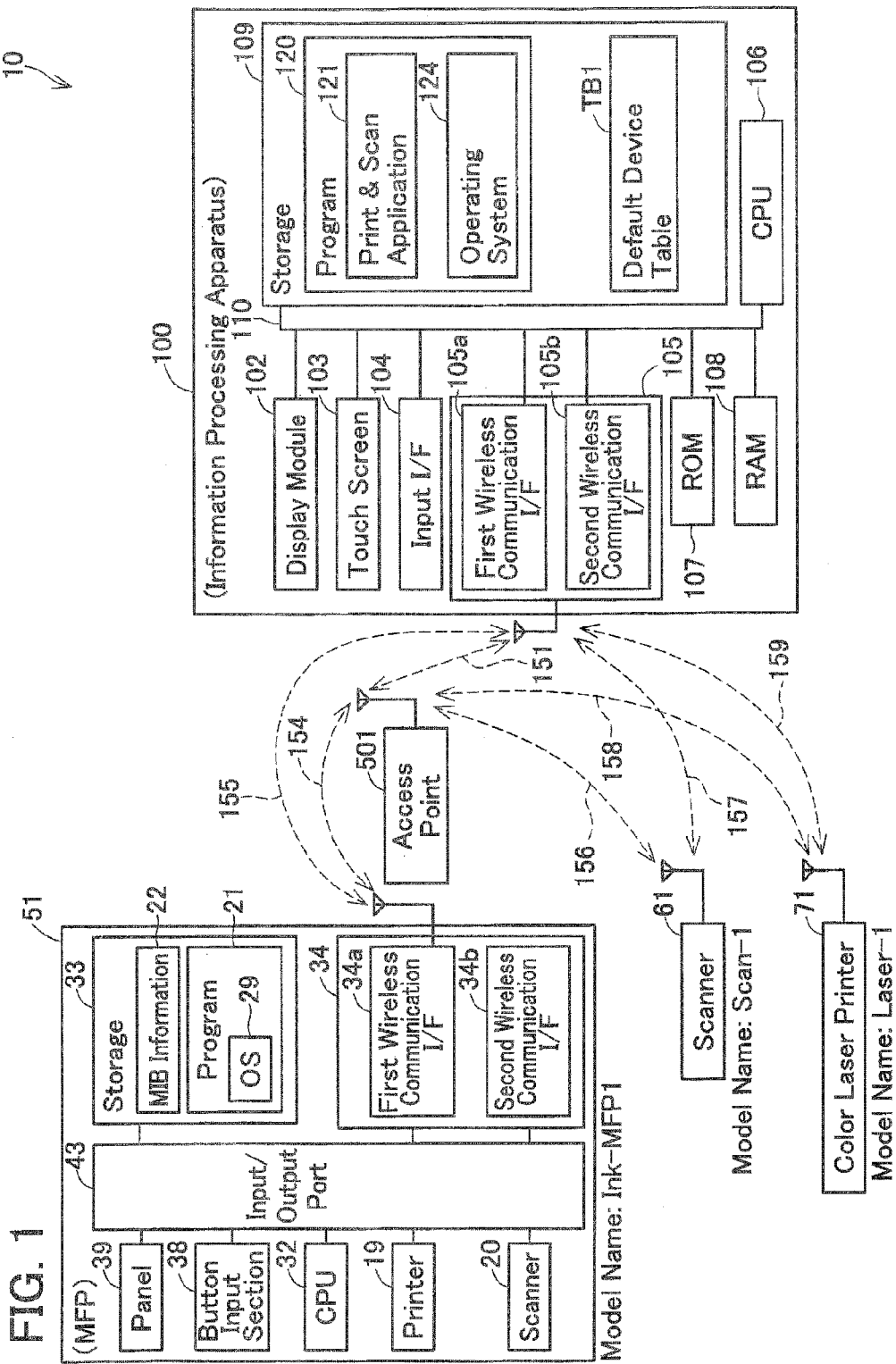
FIG. 1 is a block diagram showing a configuration of a network.

FIG. 1 is a block diagram showing a configuration of a network 10. The network 10 comprises an information processing apparatus 100, an MFP 51, a scanner 61, a color laser printer 71, and an access point 501. Here, an MFP refers to a multifunction peripheral comprising a printing function, a scan function, and a copy function.

A wireless LAN_I/F 105 of the information processing apparatus 100 is provided with a first wireless communication I/F 105a and the second wireless communication I/F 105b. The first wireless communication I/F 105a complies with the Wi-Fi (registered trademark of the Wi-Fi Alliance) protocol, and is an interface for performing Wi-Fi access point and other such wireless communications between devices via a relay device. In the present specification, a communication executed using the first Wi-Fi wireless communication I/F 105a is defined as "Wi-Fi communication". With a Wi-Fi communication, it is possible to communicate with a communication-destination device using an IP address. Furthermore, with Wi-Fi communication, it is also possible to communicate with a communication-destination device using information for identifying the communication-destination device and/or a MAC address. The first wireless communication I/F 105a can perform a Wi-Fi communication with a first wireless communication I/F 34a of the MFP 51 via a wireless communication 151, the access point 501, and a wireless communication 154. The first wireless communication I/F 105a can also perform a Wi-Fi communication with the scanner 61 via the wireless communication 151, the access point 501, and a wireless communication 156. The first wireless communication I/F 105a can also perform a Wi-Fi communication with the color laser printer 71 via the wireless communication 151, the access point 501, and a wireless communication 158.

Alternatively, the second wireless communication I/F 105b complies with the Wi-Fi Direct (described as WFD hereinbelow) protocol, and is an interface for performing a wireless communication between one device and another device, which functions as a Wi-Fi Direct relay device, without going through a relay device. In the present specification, a communication executed using the second wireless communication I/F 105b is defined as "WFD communication". With a WFD communication, it is also possible to communicate with a communication-destination device using information for identifying the communication-destination device (e.g.: a device ID) and/or a MAC address. Furthermore, with a WFD communication, it is also possible to communicate with a communication-destination device using an IP address. The second wireless communication I/F 105b can perform wireless communications 155, 157, and 159 in the WFD mode directly with each of the MFP 51, the scanner 61, and the color laser printer 71. Note that, with WFD communication and Wi-Fi communication, the wireless communication is conducted based on the 802.11 standard of The Institute of Electrical and Electronics Engineers, inc. (referred to as IEEE), and equivalent standards (for example, 802.11a, 11b, 11g, 11n or the like).

The second wireless communication I/F 105b may be configured to be used at a lower priority than the first wireless communication I/F 105a. This is because there are cases in which Wi-Fi communication provides advantages over WFD communication, such as lower power consumption and the ability to communicate simultaneously with a large number of devices. The present invention is not limited to a configuration where the first wireless communication I/F 105a and the second wireless communication I/F 105b are two physically separate interfaces. The concept includes a single interface physically functioning as either the first wireless communication I/F 105a or the second wireless communication I/F 105b in accordance with software support.

The access point 501 is a device that functions as a Wi-Fi access point, and has a service set identifier (also referred to as SSID). The SSID is a name for identifying the access point 501. The information processing apparatus 100 can send a print request or a scan request to the MFP 51, the scanner 61, and the color laser printers 71 based on communication via the wireless LAN_I/F 105 by executing a print & scan application 121.

<Configuration of Information Processing Apparatus 100>

The information processing apparatus 100 is, for example, a portable device such as a portable phone or a portable terminal device. The information processing apparatus 100 comprises a display module 102, a touch screen 103, an input I/F 104, a wireless LAN_I/F 105, an NFC I/F 112, a central processing unit (referred to as CPU) 106, a read only memory (referred to as ROM) 107, a random access memory (referred to as RAM) 108, and a storage 109. These elements are mutually connected via an I/O port 110.

The display module 102 receives an image signal output from the CPU 106, and displays an image based on the received image signal. As the display module 102, for example, an LCD or an organic EL display may be used. The touch screen 103 is made from a transparent member, and disposed so as to cover a surface of the display module 102. The touch screen 103 detects a position that was touched by a user's finger or the like, and outputs the detected position information to the CPU 106. The input I/F 104 is, for example, an operation button. The wireless LAN_I/F 105 is an interface for executing a wireless communication in the wireless LAN mode.

The CPU 106 executes programs stored in the storage 109. The RAM 108 temporarily stores information required for processing to be performed by the CPU 106. The storage 109 is configured by combining a flash memory, a hard disk (referred to as HDD), a buffer of the CPU 106, and so on. The storage 109 can store image data, document data, and the like. The storage 109 stores a program 120. The program 120 includes the print & scan application 121 (hereinafter indicated as the application 121), and an operating system 124 (hereinafter referred to as the OS 124). The CPU 106 executes processing according to the program 120.

The storage 109 may be a computer readable storage medium. The computer readable storage medium is a non-transitory medium, such as a ROM, RAM, flash memory, hard disk, etc. A ROM, RAM, flash memory, hard disk, etc. are tangible mediums. An electrical signal carrying a program to be downloaded from a server, etc. on the Internet is not included in the non-transitory medium.

The application 121 is an application for causing the CPU 106 to execute processing such as sending a printing command from the information processing apparatus 100 to the MFP 51 or the like. The OS 124 is a program that provides basic functions and is commonly used by the application 121 and the like. The OS 124 includes programs and the like for conducting a wireless communication with the wireless LAN_I/F 105. Moreover, the OS 124 is a program for the respective programs to acquire information that was acquired by the various types of hardware or for providing an application programming interface (referred to as API) for the respective programs to give commands to the various types of hardware.

Moreover, the storage 109 stores a default device table TB1. The default device table TB1 is a table for storing various information for identifying a default device. The default device is a device that is set forth each use. The default device is a device that is preferentially used among a plurality of devices when such a plurality of devices capable of executing processing pertaining to a certain use exists.

FIG. 6 shows an example of the default device table TB1. The default device table TB1 comprises a storage area for each of the three types of uses of photo printing 611, web printing 612, and scan 613. The storage area for the use in the photo printing 611 stores information for identifying the default device that is set for photo printing. With photo printing, the information processing apparatus 100 sends a print request of image data such as JPEG, Bitmap or GIF to a device having a printing function, and processing for causing the device to execute printing is performed. The storage area for use in the web printing 612 stores information for identifying the default device that is set for web printing. With web printing, the information processing apparatus 100 sends a print request of a web page to a device having a printing function, and processing for causing the device to execute printing is performed. The storage area for use in the scan 613 stores information for identifying the default device that is set for scanning. With scan, the information processing apparatus 100 sends a scan request to a device having a scan function, and processing for causing the device to execute a scan is performed.

In the default device table TB1, a model name 801, a default device type 802, an IP address 803, an SSID 804, a device ID 805, and a MAC address 806 are stored as device-related information. The model name 801 is information for identifying each type of device. In a first embodiment, the model name 801 for the MFP 51 is "Ink-MFP1". The model name 801 for the scanner 61 device is "Scan-1". The model name 801 for the color laser printer 71 device is "Laser-1".

The default device type 802 includes a Wi-Fi default device and a WFD default device. The Wi-Fi default device is a default device that is capable of communicating using the aforementioned Wi-Fi communication. The WFD default device is a default device that is capable of communicating using the aforementioned WFD communication.

The IP address 803 is an identification number that is allocated to each device and used in Wi-Fi communication. The SSID 804 is identification information for identifying an access point to be used when executing a Wi-Fi communication with a default device. The device ID 805 is identification information that is allocated to each device and used in a WFD communication. The MAC address 806 is a physical address for identifying each device. The MAC address 806 can be used as information for executing a WFD communication with a default device.

In the example of the default device table TB1 shown in FIG. 6, when device capable of executing processing related to the use of the photo printing 611 exists in a plurality with regard to that use (MFP 51 and color laser printer 71), it can be seen that the MFP 51 is set as the device that is preferentially used among the plurality of devices.

<Configuration of MFP 51>

The configuration of the MFP 51 is now explained. The MFP 51 mainly comprises a CPU 32, a storage 33, a wireless LAN_I/F 34, a button input section 38, a panel 39, a printer 19, and a scanner 20. The wireless LAN_I/F 34 is provided with a first wireless communication I/F 34a and a second wireless communication I/F 34b. The first wireless communication I/F 34a is an interface for executing a Wi-Fi communication. The second wireless communication I/F 34b is an interface for executing a WFD communication. These constituent elements are mutually communicable via an I/O port 43.

The CPU 32 executes a program 21 stored in the storage 33. The storage 33 is configured by combining a RAM, a ROM, a flash memory, an hard disk (referred to as HDD), a buffer of the CPU 32, and so on. As with the storage 109, the storage 33 may be a computer readable storage medium. The storage 33 stores the program 21 and MIB information 22. The program 21 includes an OS 29 and the like.

MIB information 22 is information related to the MFP 51 itself, and is exported to an external apparatus such as the information processing apparatus 100. The external apparatus can acquire the MIB information 22 from the MFP 51 in accordance with a request from the external apparatus. The MIB information 22 includes a model name, a MAC address, Wi-Fi status information, SSID historical information, an IP address, and so forth. The model name is information for identifying the MFP 51. In the present embodiment, the model name is "Ink-MFP1". The MAC address is the physical address for identifying the MFP 51. The Wi-Fi status information is various information related to a Wi-Fi communication. The Wi-Fi status information includes information as to whether or not a power source for the first wireless communication I/F 34a is ON, and information showing an access point that exists within the communication range of the first wireless communication I/F 34a, for example. The SSID historical information shows the SSID of an access point where the MFP 51 had been connected in the past. The IP address is information for identifying the MFP 51.

The button input section 38 is a key for executing the respective functions of the MFP 51. The button input section 38 may also be configured integrally, as a touch screen, with the panel 39. The panel 39 displays the various types of functional information of the MFP 51. The printer 19 is a portion for executing printing using the image data stored in the storage 33. The scanner 20 is a portion for executing reading.

<Points to be Noted Regarding Descriptions in Present Specification>

In the ensuing explanation, the CPU 106 to execute programs such as an application and an operating system is sometimes simply referred to by the program name. For example, the indication of "application" may mean "the CPU 106 that executes the application". In the present specification, the description "the CPU 106 of the information processing apparatus 100 receives various types of information" includes the technical meaning "the CPU 106 of the information processing apparatus 100 acquires various types of information via the wireless LAN_I/F 105". Further, the description "the CPU 106 of the information processing apparatus 100 transmits various types of information" includes the technical meaning "the CPU 106 of the information processing apparatus 100 outputs various types of information via the wireless LAN_I/F 105".

Here, a definition of the words "data" and "information" will be explained. In the present specification, "information" is used as a concept superordinate to "data". Consequently, "A data" may be rephrased as "A information". Further, even if the "information" has a different format as "data" (e.g., text format, binary format, flag format, etc.), this is treated as the same information as long as it is recognized that the meaning is the same. For example, as long as the device treats this as information indicating that the number of print copies is two parts, data of the text format "COPY=2", and data of the binary format "10" is the same information. However, the aforementioned distinction between "information" and "data" is not rigid, and exceptions to the rule are also allowed.

<Operation of Application 121>

Figure 2:
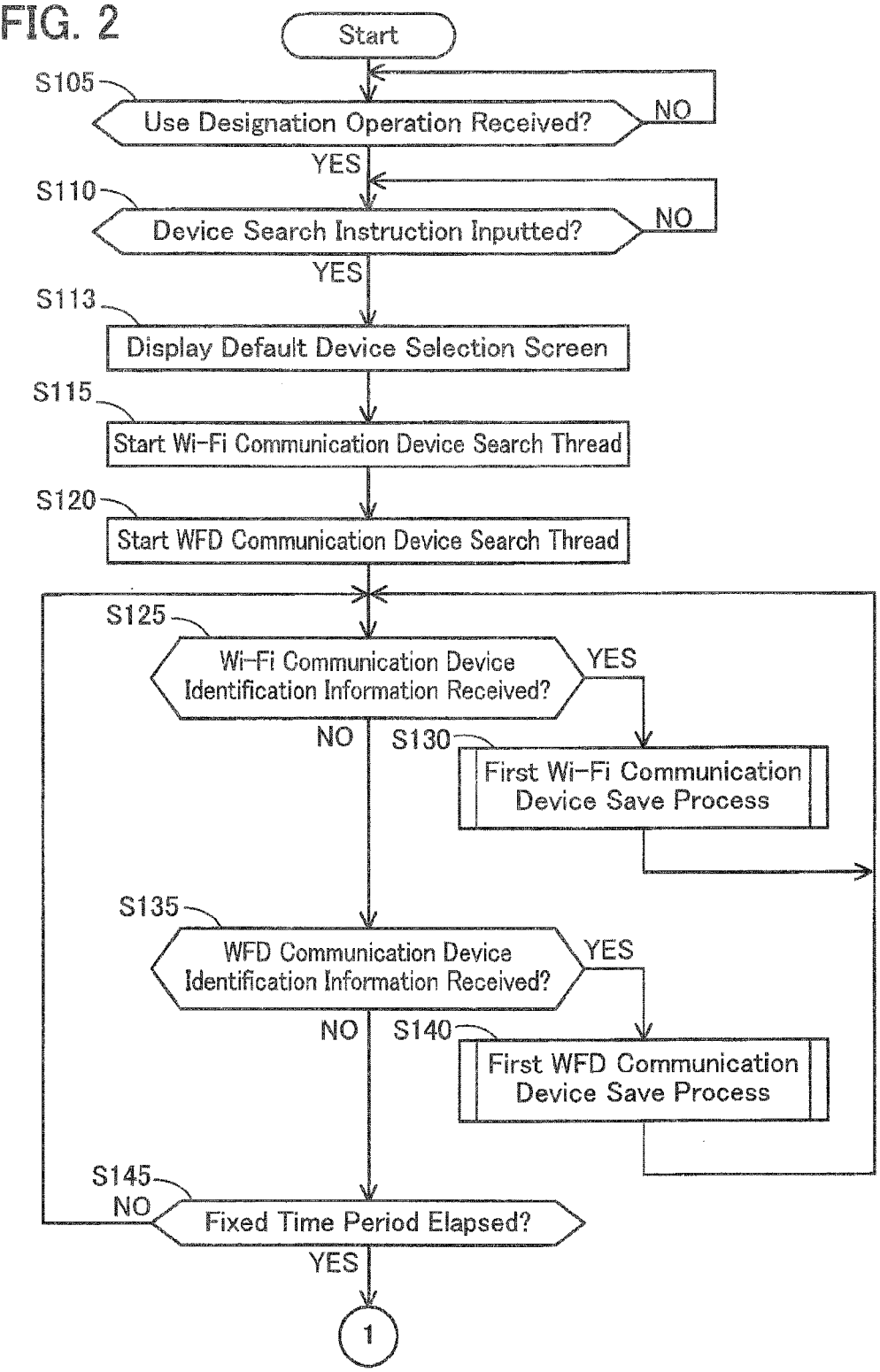
FIG. 2 is a flowchart explaining processing for a CPU to control respective parts according to an application.
Figure 3:
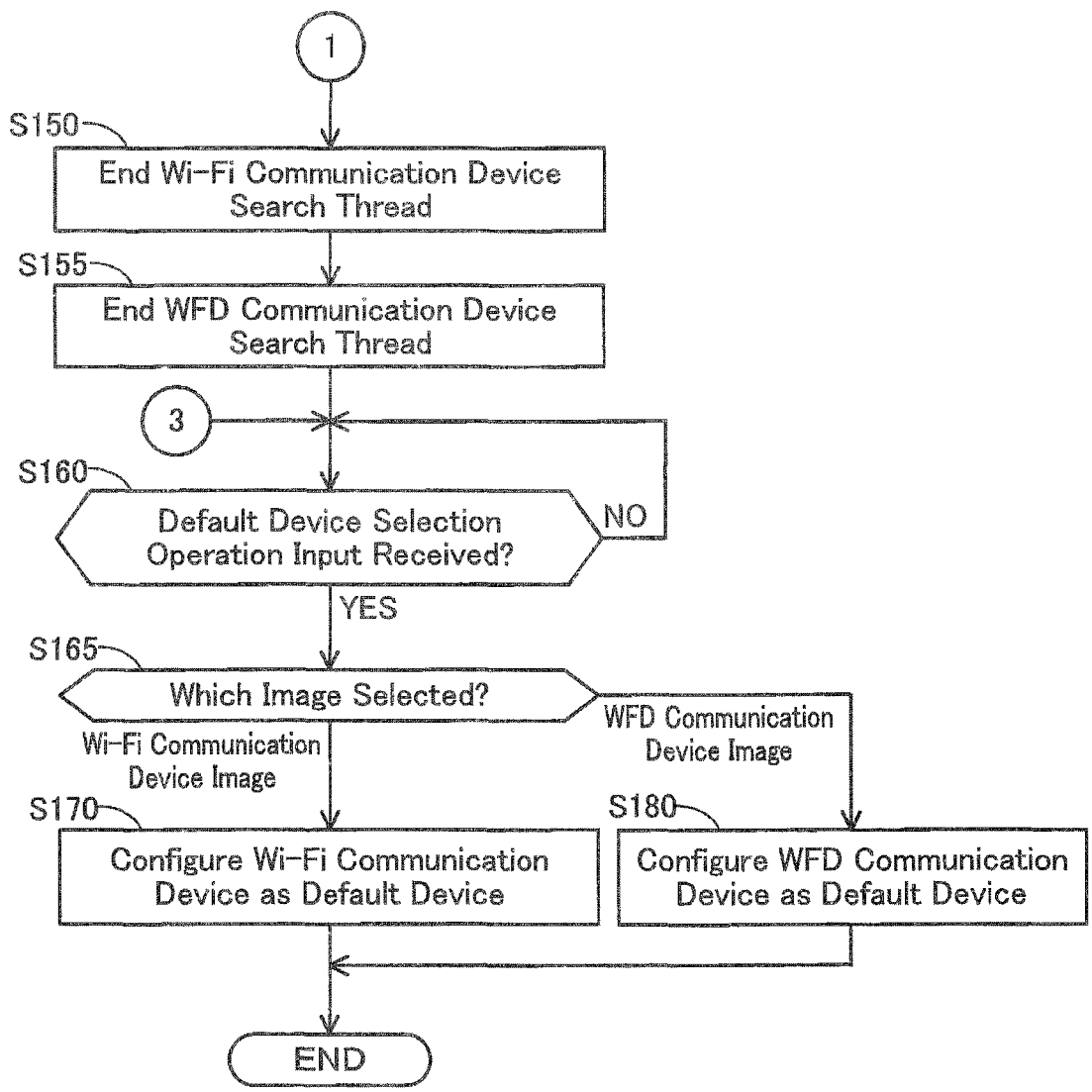
FIG. 3 is a flowchart explaining processing for a CPU to control respective parts according to an application.
Figure 4:
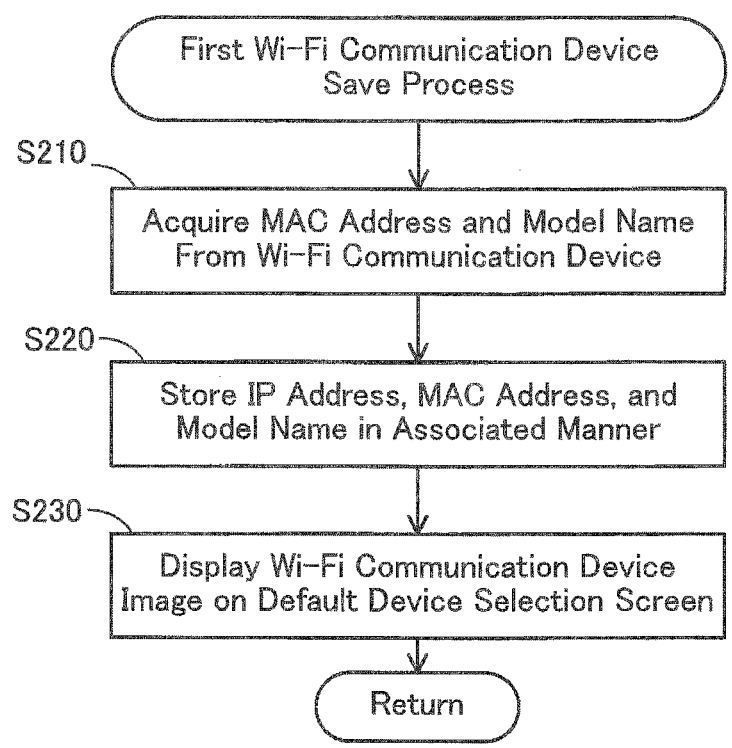
FIG. 4 shows a flowchart explaining save process for a first Wi-Fi communication device.
Figure 5:
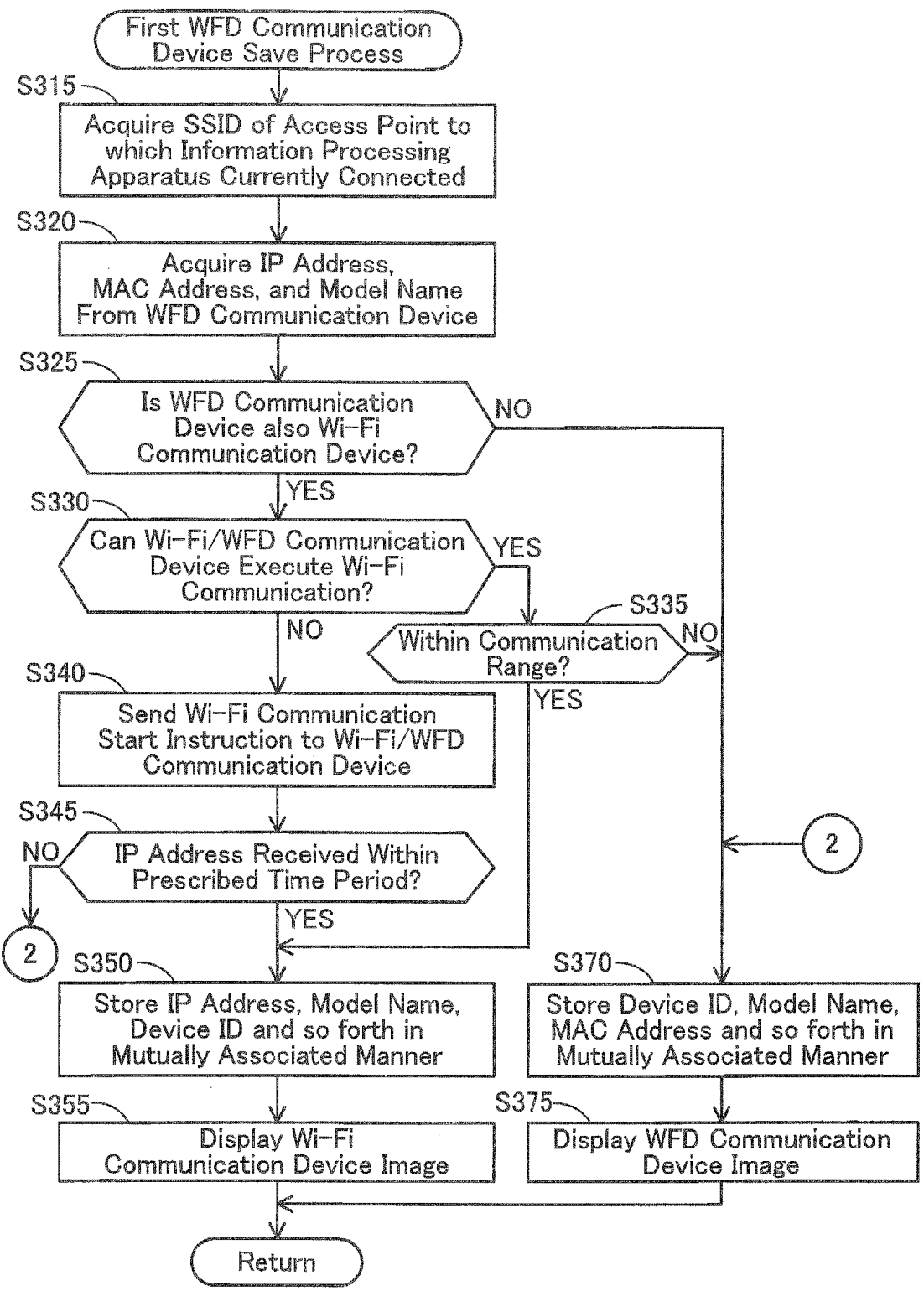
FIG. 5 shows a flowchart explaining save process for a first WFD communication device.

Processing in which the CPU 106 controls various components in accordance with the application 121 will be explained below using FIGS. 2 to 5. The flow in FIG. 2 is started in accordance with an execution instruction for a default device registration process being inputted. The default device registration process stores information related to a default device in the default device table TB1. The input of an execution instruction for the default device registration process, for example, may be executed by a user touching a registration process execution button displayed on the display module 102.

In S105, the CPU 106 determines whether or not a use designation operation that designates any of the three types of uses, i.e. "photo printing", "web printing" or "scan", has been received. For example, the application 121, in the display module 102, displays an icon corresponding to each of the aforementioned three types of uses on the display module 102. Then, when a site where an icon is being displayed has been touched, the CPU 106 determines that the use denoted by the touched icon has been designated. The processing returns to S105 when the determination is negative (S105: NO), and proceeds to S110 when the determination is affirmative (S105: YES).

In S110, the CPU 106 determines whether or not a device search instruction has been inputted. The device search instruction is an execution command for a process that searches for a device that is currently capable of communicating with the information processing apparatus 100. For example, the CPU 106 may determine whether or not a device search button being displayed on the display module 102 has been touched. The processing returns to S110 when the determination is negative (S110: NO), and proceeds to S113 when the determination is affirmative (S110: YES).

In S113, the CPU 106 displays a default device selection screen SC1 on the display module 102. The default device selection screen SC1 is for receiving a default device selection. In step S113, the search for a default device is not complete, and as such, a device constituting a selection candidate is still not being displayed on the default device selection screen SC1.

In S115, the CPU 106 starts a Wi-Fi communication device search thread. The Wi-Fi communication device search thread is a program for determining whether or not a Wi-Fi communication device that is capable of communicating using the first wireless communication I/F 105*a* is included among a plurality of external devices (that is, the MFP 51, the scanner 61, and the color laser printer 71). Specifically, the CPU 106 broadcasts a packet to the plurality of external devices requesting that the external devices respond with identification information (e.g.: an IP address), and waits for the identification information responses from the external devices.

In S120, the CPU 106 starts a WFD communication device search thread. The WFD communication device search thread is a program for determining whether or not a WFD communication device that is capable of communicating using the second wireless communication I/F 105*b* is included among a plurality of external devices (that is, the MFP 51, the scanner 61, and the color laser printer 71). Specifically, the CPU 106 uses the second wireless communication I/F 105*b* to broadcast a packet requesting that the external devices respond with identification information (e.g.: an IP address). Then, the CPU 106 waits for the identification information responses from the external devices.

In S125, the CPU 106 determines whether or not Wi-Fi communication device identification information has been received. This determination may be made in accordance with whether or not an IP address has been received in response to the packet broadcast in the Wi-Fi communication device search thread (S115). When the determination is affirmative (S125: YES), the CPU 106 is able to determine that a Wi-Fi communication device is included among the plurality of external devices. Accordingly, the processing proceeds to S130.

In S130, the CPU 106 executes a first Wi-Fi communication device save process. The content of the first Wi-Fi communication device save process will be explained using FIG. 4.

In S210, the CPU 106 uses the IP address received in S125 to acquire information related to the Wi-Fi communication device from the relevant Wi-Fi communication device. The acquisition of information related to the Wi-Fi communication device is performed using the first wireless communication I/F 105*a*. The information related to the Wi-Fi communication device may be MIB information. In the present embodiment, a case in which the MAC address and the model name of the Wi-Fi communication device are acquired as the information related to the Wi-Fi communication device will be explained as an example.

In S220, the CPU 106 stores the IP address of the Wi-Fi communication device and the MAC address and model name of the Wi-Fi communication device in a mutually associated manner in the storage 109.

In S230, the CPU 106 displays a Wi-Fi communication device image P1 on the default device selection screen SC1 as a default device selection candidate. The Wi-Fi communication device image P1 includes: the model name of the Wi-Fi communication device; and information (e.g.: IP address) showing the fact that it is possible to communicate with the Wi-Fi communication device using a Wi-Fi communication. Then, the processing returns to S125 of FIG. 2.

Alternatively, when the determination is negative in S125 (S125: NO), the processing proceeds to S135. In S135, the CPU 106 determines whether or not identification information for identifying a WFD communication device has been received. This determination may be made in accordance with whether or not a device ID has been received in response to the packet that was broadcast in the WFD communication device search thread (S120). When the determination is affirmative (S135: YES), the CPU 106 is able to determine that a WFD communication device is included among the plurality of external devices. Accordingly, the processing proceeds to S140.

In S140, the CPU 106 executes a first WFD communication device save process. The contents of the first WFD communication device save process will be explained using FIG. 5.

In S315, the CPU 106 acquires from the OS 124 the SSID of the access point with which the information processing apparatus 100 is currently connected.

In S320, the CPU 106 uses the device ID acquired in S135 to acquire information related to the WFD communication device from the relevant WFD communication device. The acquisition of the information related to the WFD communication device is performed using the second wireless communication I/F 105*b*. The information related to the WFD communication device may be MIB information. This will be explained in detail. The CPU 106, via the second wireless communication I/F 105*b*, sends query information requesting the MIB information that the WFD communication device is registering. Then, the CPU 106 receives via the second wireless communication I/F 105*b* the MIB information returned in response to the query information. In the present embodiment, a case in which a model name, a MAC address, Wi-Fi status information, SSID historical information, and an IP address are acquired as the MIB information will be explained as an example.

In S325, the CPU 106 determines whether or not the WFD communication device is also a Wi-Fi communication device. In other words, a determination is made as to whether or not the device that was determined to be able to execute a WFD communication in S135 is also able to execute a Wi-Fi communication. This determination may be made in accordance with whether or not the same SSID as the SSID acquired in S315 was acquired in S320 as the SSID historical information. In a case where the determination is negative (S325: NO), the processing proceeds to S370.

In S370, the CPU 106 stores the device ID of the WFD communication device and the information related to the WFD communication device (that is, the model name, the MAC address, the Wi-Fi status information, the SSID historical information, and the IP address) in a mutually associated manner in the storage 109. In S375, the CPU 106 displays a WFD communication device image P2 on the default device selection screen SC1 as a default device selection candidate. The WFD communication device image P2 includes: the model name of the WFD communication device; and information (e.g.: device ID and MAC address) showing the fact that it is possible to communicate with the WFD communication device using a WFD communication. Then, the processing returns to S125 of FIG. 2.

That is, the WFD communication device image P2 is displayed on the default device selection screen SC1 (S375) only in a case where SSID historical information denoting the WFD communication device identified by the device ID acquired in S135 as a Wi-Fi communication device is not received (S325: NO). The WFD communication device image P2 corresponds to "second image" in the claims. The SSID historical information corresponds to "first communication device identification information" in the claims. The device ID corresponds to "second communication device identification information" in the claims. The term "only" here shall not be interpreted in a limited way. That is, the present invention includes the concept that the WFD communication device image P2 corresponding to a second image is displayed only when, from among the two choices of received or not received, SSID historical information corresponding to the first communication device identification information was not received. The display of the WFD communication device image P2 corresponding to the second image is not excluded by an element other than the relevant two choices. An instruction by the user can be cited as an element other than the relevant two choices, for example. Furthermore, the display of a third image that is different from the second image is also not excluded when SSID historical information corresponding to the first communication device information has been received. A mode for displaying a smaller image (e.g.: WFD communication device image P2 of FIG. 8) denoting a WFD communication device (this corresponds to "second communication device" in the claims), for example, is included in modes for displaying the third image. Furthermore, a mode for displaying the image denoting a WFD communication device in a position (e.g.: bottom side of default device selection screen SC1 of FIG. 8) that differs from an original display position (e.g.: WFD communication device image P2 display position of FIG. 8) and/or on a different screen is include in the modes for displaying the third image, for example.

In other words, the WFD communication device image P2 (this corresponds to "second image" in the claims) is displayed on the default device selection screen SC1 (S375) in accordance with the SSID historical information (this corresponds to "response information" in the claims) denoting that the WFD communication device can execute a communication on the basis of the Wi-Fi communication protocol not being received (S325: NO). The expression "in accordance with the response information not being received" here shall not be interpreted in a limited way. That is, the display of the second image is not excluded when response information was received.

Alternatively, when a determination was made in S325 that the WFD communication device is also a Wi-Fi communication device (S325: YES), the processing proceeds to S330. Hereinafter, a device that is both a WFD communication device and a Wi-Fi communication device will be described as a Wi-Fi/WFD communication device. In S330, the CPU 106 determines whether or not a Wi-Fi/WFD communication device is in a state capable of executing a Wi-Fi communication. This determination may be made on the basis of Wi-Fi status information acquired in S320. When the determination is affirmative (S330: YES), the processing proceeds to S335.

In S335, the CPU 106 determines whether or not the Wi-Fi/WFD communication device is within Wi-Fi communication range. This determination may be made in accordance to whether or not various types of information can be acquired from the Wi-Fi/WFD communication device via the first wireless communication I/F 105a. Furthermore, this determination may be made on the basis of the Wi-Fi status information acquired in S320. The processing proceeds to S370 when the determination is negative (S335: NO), and proceeds to S350 when the determination is affirmative (S335: YES).

Alternatively, when it has been determined in S330 that the Wi-Fi/WFD communication device is not able to execute a Wi-Fi communication (S330: NO), the processing proceeds to S340. In S340, the CPU 106 sends a Wi-Fi communication start instruction to the Wi-Fi/WFD communication device. The Wi-Fi communication start instruction is information for instructing the Wi-Fi/WFD communication device to configure a device status that will enable the execution of a Wi-Fi communication.

In S345, the CPU 106, within a prescribed period of time after sending the Wi-Fi communication start instruction, determines whether or not the IP address of the Wi-Fi/WFD communication device has been received from the Wi-Fi/WFD communication device via a WFD communication. The prescribed period of time may be one second, for example. The processing proceeds to S370 when the determination is negative (S345: NO), and proceeds to S350 when the determination is affirmative (S345: YES).

In S350, the CPU 106 stores the IP address, the model name, the device ID, and the MAC address of the Wi-Fi/WFD communication device in a mutually associated manner in the storage 109.

In S355, the CPU 106 displays the Wi-Fi communication device image P1 on the default device selection screen SC1 as the image denoting the Wi-Fi/WFD communication device. Then, the processing returns to S125 of FIG. 2.

When the determination is negative in S135 of FIG. 2 (S135: NO), the processing proceeds to S145. In S145, the CPU 106 determines whether or not a fixed period of time has elapsed since starting the Wi-Fi communication device search thread or the WFD communication device search thread in S115 or S120. The processing returns to S125 when the determination is negative (S145: NO), and proceeds to S150 when the determination is affirmative (S145: YES).

In S150, the CPU 106 ends the Wi-Fi communication device search thread started in S115. In S155, the CPU 106 ends the WFD communication device search thread started in S120.

In S160, the CPU 106 determines whether or not a default device selection operation input has been received. The default device selection operation is an operation in which the user touches the image of the device to be selected as the default device from among the Wi-Fi communication device image P1 and the WFD communication device image P2 being displayed on the default device selection screen SC1. The processing returns to S160 when the determination is negative (S160: NO), and proceeds to S165 when the determination is affirmative (S160: YES).

In S165, the CPU 106 determines whether the selected image is the Wi-Fi communication device image P1 or the WFD communication device image P2. In the case of the Wi-Fi communication device image P1 (S165: Wi-Fi communication device image), the flow proceeds to S170. In S170, the CPU 106 configures the Wi-Fi communication device as the default device. Specifically, in the default device table TB1 (see FIG. 6), the CPU 106 selects the row corresponding to the use selected from among photo printing 611 to scan 613 in S105. Then, the CPU 106 configures the default device type 802 of the selected row to "Wi-Fi default device". The CPU 106 also reads the IP address 803, the SSID 804, the device ID 805, and the MAC address 806 of the device configured as the default device from the storage 109, and writes same in the selected default device table TB1 row. The CPU 106 then ends the flow.

Alternatively, when the image selected in S165 is the WFD communication device image P2 (S165: WFD communication device image), the processing proceeds to S180. In S180, the CPU 106 configures the WFD communication device as the default device. Specifically, in the default device table TB1, the CPU 106 configures the default device type 802 to "WFD default device". The other content is the same as the content described above in S170, and as such an explanation will be omitted. The CPU 106 then ends the flow.

<First Effect>

A case in which the MFP 51 is registered as the default device will be explained as an example. Furthermore, a case in which the MFP 51 is a Wi-Fi/WFD communication device capable of executing both a WFD communication and a Wi-Fi communication will be explained. In this case, two images, e.g. a Wi-Fi communication device image P101 and a WFD communication device image P102, are displayed as images denoting a single MFP 51 as in the default device selection screen SC100 shown in FIG. 9. The Wi-Fi communication device image P101 here is an image denoting the fact that the MFP 51 is a Wi-Fi communication device. The WFD communication device image P102 is an image denoting the fact that the MFP 51 is a WFD communication device. In a case like this, there is a danger that a user who is trying to select the MFP 51 as the default device will be confused as to which of the images, i.e. the Wi-Fi communication device image P101 or the WFD communication device image P102, he should select. That is, there are cases where user-friendliness is lost because the default device-related information is not properly displayed.

According to the application 121 described in the present specification, the CPU 106 can start the Wi-Fi communication device search thread (S115) and the WFD communication device search thread (S120) when a device search commences (S110: Y). Then, when it has been determined in advance that the MFP 51 is a Wi-Fi communication device (S125: YES), the CPU 106 can display the Wi-Fi communication device image P1 denoting that the MFP 51 is a Wi-Fi communication device on the default device selection screen SC1 (S230) (Refer to FIG. 7). Thereafter, when it has been determined that the MFP 51 is also a WFD communication device (post-loop S135: YES), the CPU 106 can continue to display the Wi-Fi communication device image P1 on the default device selection screen SC1 without displaying the WFD communication device image P2 denoting that the MFP 51 is a WFD communication device on the default device selection screen SC1 (S335) (Refer to FIG. 7). That is, when the MFP 51 is a Wi-Fi/WFD communication device, the CPU 106 can display the MFP 51 on the display module 102 as a Wi-Fi communication device rather than as a WFD communication device. When the MFP 51 is a Wi-Fi/WFD communication device, this makes it possible to prevent a situation in which a plurality of images denoting the MFP 51 is displayed on the default device selection screen (Refer to FIG. 9). Accordingly, it becomes possible to execute a proper display so as not to confuse the user.

<Second Effect>

The CPU 106 determines whether a Wi-Fi communication device and/or a WFD communication device are included among a plurality of external devices by repeatedly looping S125 to S145 for a fixed period of time. However, there is no way of telling which determination, i.e. the determination that a Wi-Fi communication device is included (S125: YES), or the determination that a WFD communication device is included (S135: YES), will be concluded first. This is because the time required for these determinations to be concluded is determined by a large number of undetermined parameters, such as the state of the external device (e.g.: sleep mode or not), the network status, and the communication speed. In a case like this, it is difficult to prevent a plurality of images denoting the MFP 51 from being displayed on the default device selection screen (Refer to FIG. 9).

According to the application 121 described in the present specification, when the CPU 106 has determined that the MFP 51 is a WFD communication device (S135: YES) prior to determining whether or not the MFP 51 is a Wi-Fi communication device, the CPU 106 can wait for a prescribed time period before displaying the WFD communication device image P2 on the default device selection screen SC1 (S345). Then, while waiting to display the WFD communication device image P2, the CPU 106 can confirm whether or not the MFP 51 is also a Wi-Fi communication device. Specifically, the CPU 106 can use the second wireless communication I/F 105b to query the MFP 51 as to whether or not it is possible to execute a communication using the first wireless communication I/F 105a (S320). Then, the CPU 106 can confirm whether or not the MFP 51 is also a Wi-Fi communication device by acquiring MIB information as the SSID historical information of the MFP 51 (S320), and comparing same to the SSID of the access point with which the information processing apparatus 100 is currently connected (S325).

Then, when it is not possible to confirm that the MFP 51 is also a Wi-Fi communication device within the prescribed time period (S345: NO), the CPU 106 can display the WFD communication device image P2 on the default device selection screen SC1 (Refer to FIG. 8). Alternatively, when it was possible to confirm that the MFP 51 is also a Wi-Fi communication device within the prescribed time period (S345: YES), the CPU 106 can display the Wi-Fi communication device image P1 on the default device selection screen SC1 (Refer to FIG. 7). This makes it possible to prevent a plurality of images (that is, the Wi-Fi communication device image P1 and the WFD communication device image P2) denoting a single MFP 51 from being displayed on the default device selection screen (Refer to FIG. 9) even when a determination that the MFP 51 is a WFD communication device was executed earlier than a determination that the MFP 51 is a Wi-Fi communication device.

<Third Effect>

According to the application 121 described in the present specification, in a case where the MFP 51, which has been determined to be a WFD communication device, was thereafter determined to also be a Wi-Fi communication device (S325: YES), the CPU 106 can send a Wi-Fi communication start instruction to the MFP 51 (S340) when a determination has been made that the MFP 51 is not able to execute a Wi-Fi communication (S330: NO). The Wi-Fi communication start instruction is information instructing the MFP 51 to configure the MFP 51 to be able to execute a Wi-Fi communication (e.g.: to turn ON the first wireless communication I/F 34*a*). This makes it possible to send the Wi-Fi communication start instruction to the MFP 51 using a WFD communication. That is, it becomes possible to use a low-priority WFD communication to achieve a configuration that enables the execution of a high-priority Wi-Fi communication.

<Fourth Effect>

Figure 7:
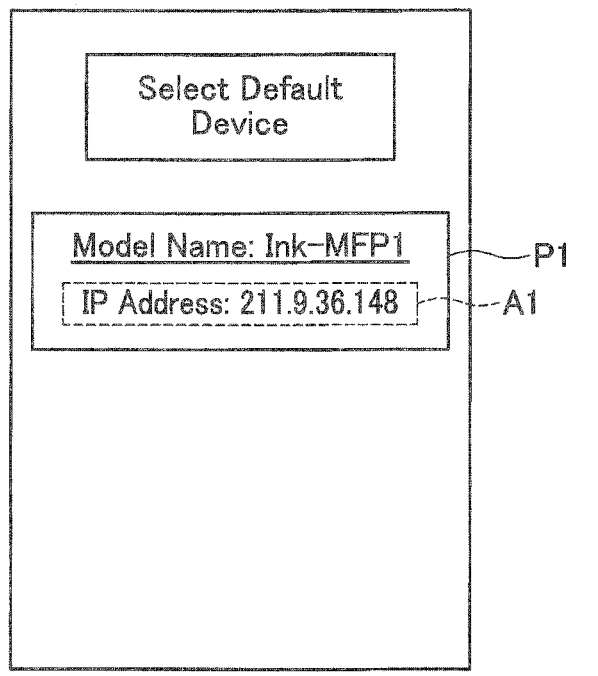
FIG. 7 shows a diagram showing an example of a default device selection screen display.
Figure 8:
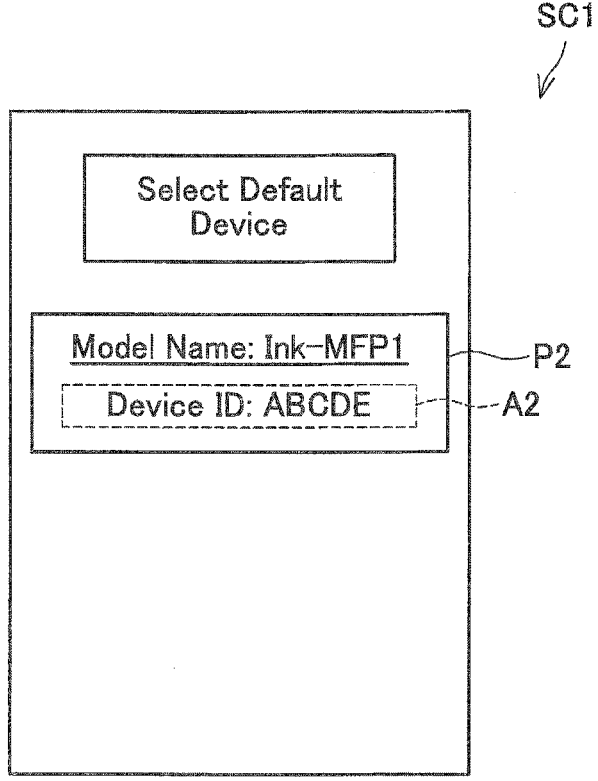
FIG. 8 shows a diagram showing an example of a default device selection screen display.

According to the application 121 described in the present specification, the CPU 106 can display an IP address, which is information used in a Wi-Fi communication, in the Wi-Fi communication device image P1 (FIG. 7, area A1). This makes it possible to make the user aware of the fact that the Wi-Fi communication device image P1 denotes a device that is capable of a Wi-Fi communication. The CPU 106 can also display a device ID, which is information used in a WFD communication, in the WFD communication device image P2 (FIG. 8, area A2). This makes it possible to make the user aware of the fact that the WFD communication device image P2 denotes a device that is capable of a WFD communication.

<Fifth Effect>

According to the application 121 described in the present specification, the CPU 106 can confirm whether or not the MFP 51, which has been determined to be a WFD communication device, is also a Wi-Fi communication device (S325) by using the SSID for identifying the access point with which the information processing apparatus 100 is currently connected (S315) and the SSID historical information for identifying an access point with which the MFP 51 was connected in the past (S320). This confirmation process can be executed reliably since the SSID is commonly used information.

<Second Embodiment>

The first embodiment described above was a configuration for parallelly executing the Wi-Fi communication device search thread (S115) and the WFD communication device search thread (S120). In a second embodiment, a configuration for serially executing a Wi-Fi communication device search thread and a WFD communication device search thread will be explained using FIG. 10. Furthermore, the configuration of the network 10 used in the second embodiment has already been explained in the first embodiment, and therefore an explanation will be omitted here.

Figure 10:
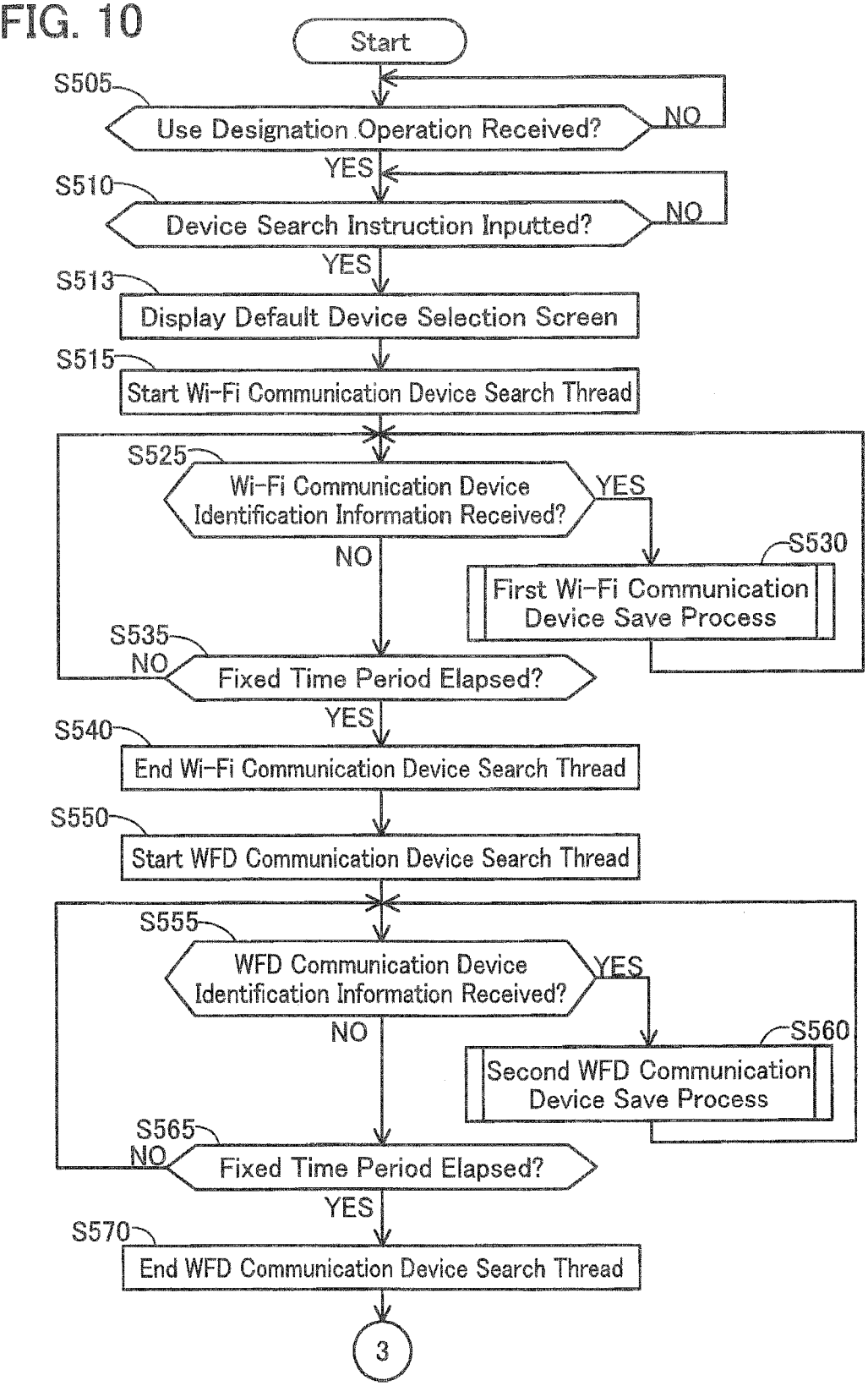
FIG. 10 is a flowchart explaining processing for a CPU to control respective parts according to an application.

The contents of S505 to S513 of FIG. 10 are the same as the contents of S105 to S113 of FIG. 2, and therefore explanations will be omitted. In S515, the CPU 106 starts a Wi-Fi communication device search thread. Since the content of S515 is the same as the content of S115 of FIG. 2, an explanation will be omitted. In S525, the CPU 106 determines whether or not Wi-Fi communication device identification information has been received. Since the content of S525 is the same as the content of S125 of FIG. 2, an explanation will be omitted. When the determination in S525 is affirmative (S525: YES), the processing proceeds to S530.

In S530, the CPU 106 executes a first Wi-Fi communication device save process. The contents of the first Wi-Fi communication device save process has already been explained using FIG. 4, and therefore an explanation will be omitted.

Alternatively, when the determination in S525 is negative (S525: NO), the processing proceeds to S535. In S535, the CPU 106 determines whether or not a fixed period of time has elapsed since starting the Wi-Fi communication device search thread in S515. The processing returns to S525 when the determination is negative (S535: NO), and proceeds to S540 when the determination is affirmative (S535: YES). In S540, the CPU 106 ends the Wi-Fi communication device search thread started in S515. Then, the processing proceeds to S550.

In S550, the CPU 106 starts a WFD communication device search thread. In S555, the CPU 106 determines whether or not WFD communication device identification information has been received. Since the content of S555 is the same as the content of S135 described above, an explanation will be omitted. When the determination is affirmative (S555: YES), the processing proceeds to S560.

Figure 11:
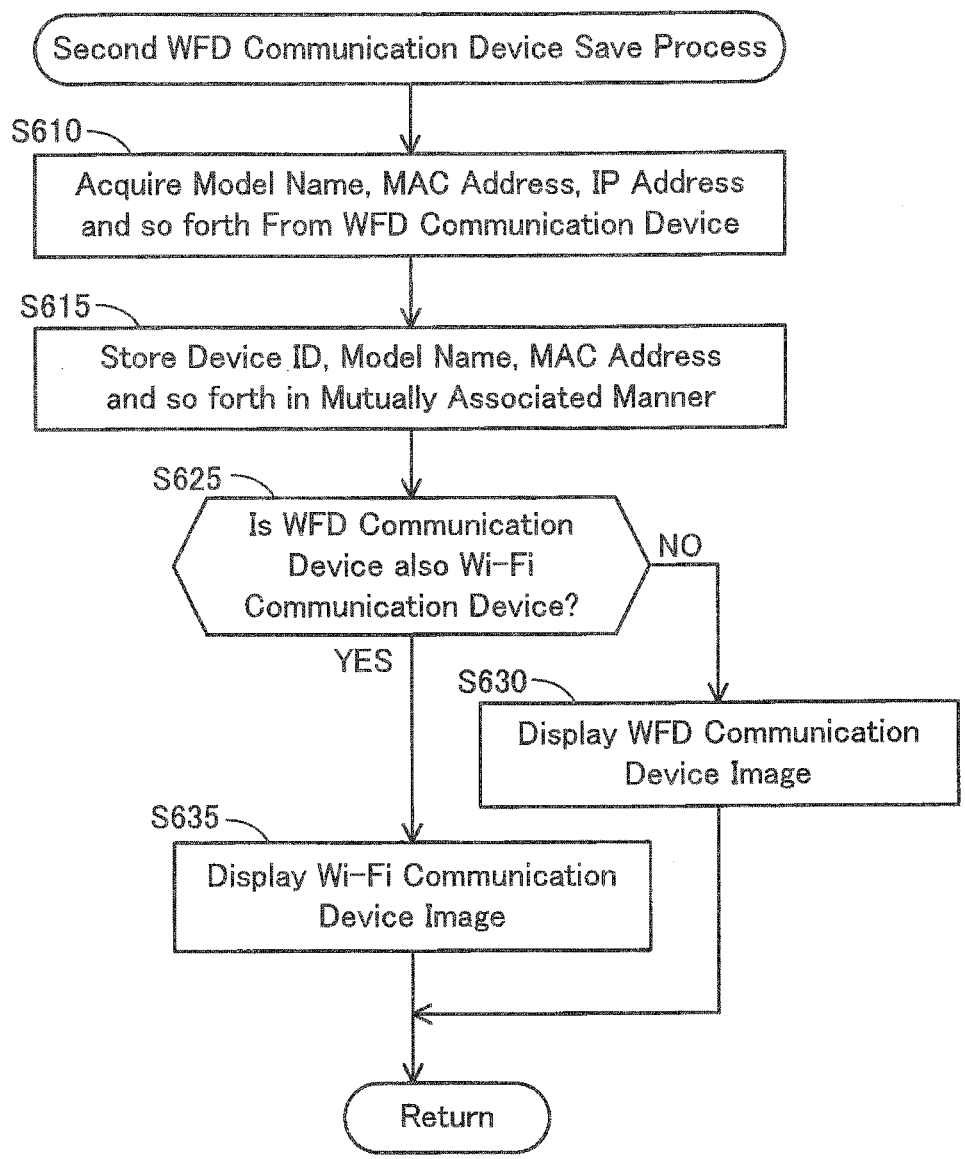
FIG. 11 shows a flowchart explaining save process for a second WFD communication device.

In S560, the CPU 106 executes a second WFD communication device save process. The contents of the second WFD communication device save process will be explained using FIG. 11. In S610, the CPU 106, using the device ID acquired in S555, acquires information related to a WFD communication device from the WFD communication device. The content of S610 is the same as the content of S320 explained above, and therefore an explanation will be omitted.

In S615, the CPU 106 stores in the storage 109 the device ID of the WFD communication device and information related to the WFD communication device (that is, a model name, a MAC address, and so forth) in a mutually associated manner.

In S625, the CPU 106 determines whether or not the WFD communication device detected in S555 is also a Wi-Fi communication device. This determination may be made in accordance with whether or not the MAC address acquired in S210 and the MAC address acquired in S610 are a match. When the determination is negative (S625: NO), the processing proceeds to S630. In S630, the CPU 106 displays the WFD communication device image P2 on the default device selection screen SC1 as a default device selection candidate. Then, the processing returns to S555.

Alternatively, when the determination in S625 is affirmative (S625: YES), the processing proceeds to S635. In S635, the CPU 106 displays the Wi-Fi communication device image P1 on the default device selection screen SC1. Then the processing returns to S555.

Alternatively, when the determination in S555 is negative (S555: NO), the processing proceeds to S565. In S565, the CPU 106 determines whether or not a fixed period of time has elapsed since starting the WFD communication device search thread in S550. The processing returns to S555 when the determination is negative (S565: NO), and proceeds to S570 when the determination is affirmative (S565: YES). In S570, the CPU 106 ends the WFD communication device search thread started in S550. Then, the processing proceeds to S160 of FIG. 3. The contents of S160 and beyond have already been explained, and therefore explanations will be omitted.

<Effects>

A case in which the MFP 51 is registered as the default device will be explained as an example. Furthermore, a case in which the MFP 51 is a Wi-Fi/WFD communication device that is capable of executing both a WFD communication and a Wi-Fi communication will be explained. According to the application 121 described in the present specification, the CPU 106 can start the Wi-Fi communication device search thread (S515) when a device search is commenced (S510: YES). In the Wi-Fi communication device search thread, the MFP 51 is detected as a Wi-Fi communication device (S525: YES), and therefore a first Wi-Fi communication device save process (S530) is executed (Refer to FIG. 4). The Wi-Fi communication device image P1 denoting the MFP 51 is displayed on the default device selection screen SC1 (S230) (Refer to FIG. 7). Then, a WFD communication device search thread (S550) is started in accordance with the Wi-Fi communication device search thread having ended. In the WFD communication device search thread, the MFP 51 is detected as a WFD device (S555: YES), and therefore a second WFD communication device save process (S560) is executed. Since the MFP 51 is a Wi-Fi/WFD communication device (S625: YES), the CPU 106 can maintain the state in which the Wi-Fi communication device image P1 is displayed on the default device selection screen SC1 as the image denoting the MFP 51 (Refer to FIG. 7).

In the application 121 related to the second embodiment, the CPU 106 can execute a WFD communication device search thread (S550) after completing the Wi-Fi communication device search thread (S515) and determining whether or not a Wi-Fi communication is possible. Therefore, in the WFD communication device search thread, the need to execute the process for confirming whether or not a Wi-Fi communication is possible (S330) and/or the process for making a Wi-Fi communication possible (S340) can be eliminated. This makes it possible to do away with the need for the MFP 51 or other such external device to store the MIB information 22 since there is no need to acquire MIB information that includes the Wi-Fi status information and so forth. This makes it possible to simplify the system configuration.

<Third Embodiment>

In a third embodiment, a configuration for executing a second Wi-Fi communication device save process in place of the first Wi-Fi communication device save process (FIG. 2, S130), and for executing a second WFD communication device saved process (FIG. 11) in place of the first WFD communication device save process (S140) will be explained. The second WFD communication device save process (FIG. 11) has been explained in the second embodiment, and therefore an explanation will be omitted here. In the third embodiment, only the differences with the first embodiment will be explained.

Figure 12:
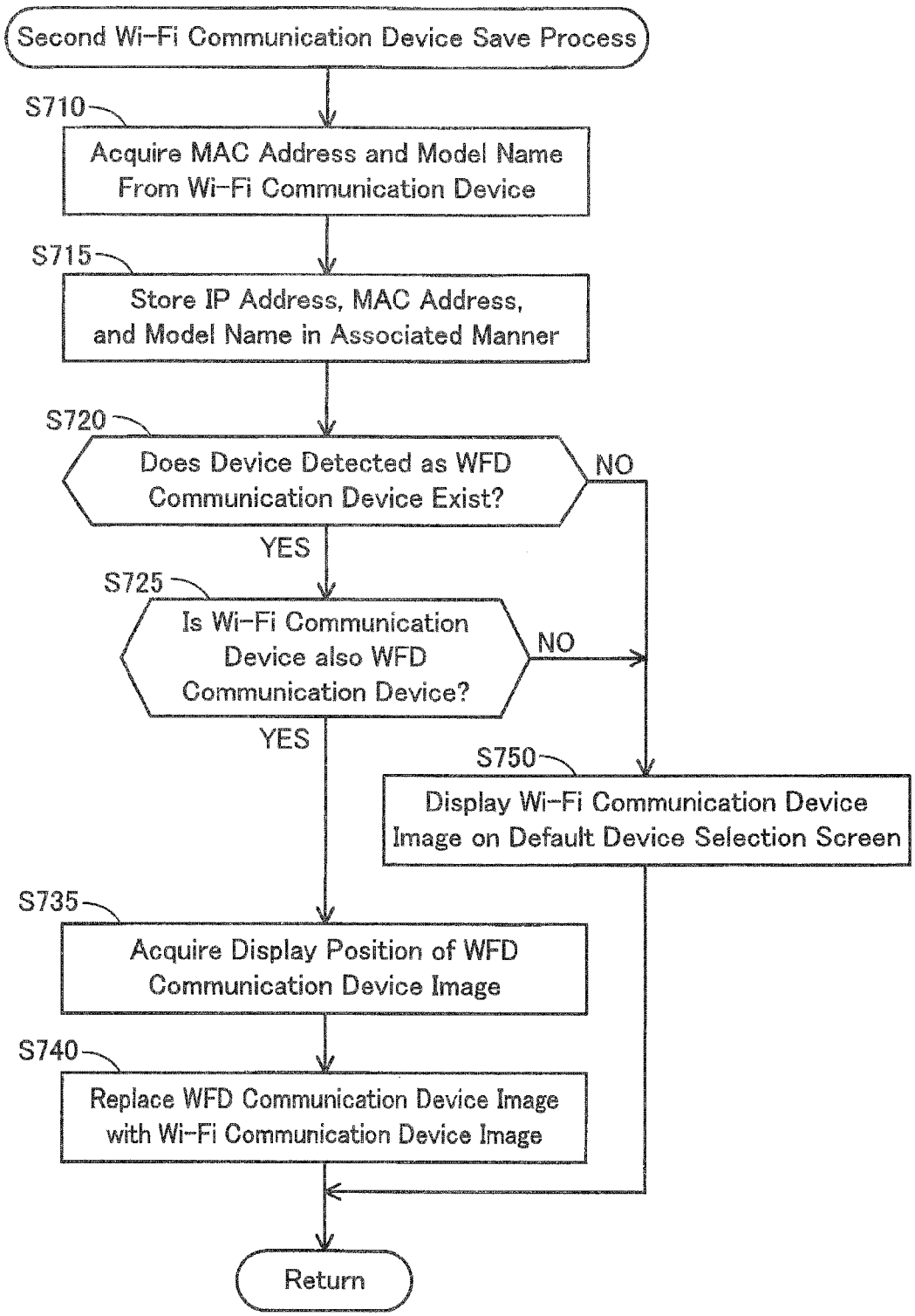
FIG. 12 shows a flowchart explaining save process for a second Wi-Fi communication device.

The contents of second Wi-Fi communication device save process executed in S130 will be explained using FIG. 12. The contents of S710 and S715 of FIG. 12 are the same as the contents of S210 and S220 of FIG. 4, and therefore explanations will be omitted.

In S720, the CPU 106 determines whether or not there exists a device that has been detected as a WFD device. This determination may be made in accordance with whether or not the information denoting the WFD communication device (e.g.: MAC address) was stored in the storage 109 (S615). When the determination is negative (S720: NO), the processing proceeds to S750. In S750, the CPU 106 displays the Wi-Fi communication device image P1 on the default device selection screen SC1 as the image denoting the device that was detected as the Wi-Fi communication device in S125. Then, the processing returns to S125.

Alternatively, when the determination made in S720 was affirmative (S720: YES), the processing proceeds to S725. In S725, the CPU 106 determines whether or not the device that was detected as the Wi-Fi communication device in S125 is also a WFD communication device. In other words, the CPU 106 determines whether or not the device that was determined to be able to execute a Wi-Fi communication in S125 is also capable of executing a WFD communication. This determination may be made in accordance with whether or not the MAC address acquired in S710 matches the MAC address being stored in the storage 109. When the determination is negative (S725: NO), the processing proceeds to S750. Alternatively, when the determination is affirmative (S725: YES), the CPU 106 determines that the WFD communication device image P2 is already being displayed on the default device selection screen SC1 as the image denoting the device detected as the Wi-Fi communication device in S125. Accordingly, the processing proceeds to S735.

In S735, the CPU 106 acquires from the OS 124 the display position of the WFD communication device image P2 on the default device selection screen SC1.

In S740, the CPU 106 ends the display of the WFD communication device image P2. The processing then returns to S125. Various modes are included in a configuration for ending the display of the WFD communication device image P2. For example, the CPU 106 may display the Wi-Fi communication device image P1 in the position where the WFD communication device image P2 is being displayed as the image denoting the device that was detected in S125. In accordance with this, the WFD communication device image P2 is replaced by the Wi-Fi communication device image P1. Furthermore, a mode for displaying a smaller WFD communication device image P2, a mode for displaying the WFD communication device image P2 in a position that differs from the original display position, and a mode for displaying the WFD communication device image P2 on a different screen are included, for example.

<Effects>

A case in which the MFP 51 is registered as the default device will be explained as an example. A case in which the MFP 51 is a Wi-Fi/WFD communication device that is capable of executing both a WFD communication and a Wi-Fi communication will also be explained. Furthermore, a case in which the MFP 51 is first detected as a WFD communication device (S135: YES), and thereafter detected as a Wi-Fi communication device (S125: YES) will be explained. When the MFP 51 is detected as a WFD communication device (S135: YES), the WFD communication device image P2 is displayed (S630) as the image denoting the MFP 51 without waiting for a determination as to whether or not the MFP 51 is also a Wi-Fi communication device (Refer to FIG. 8). Thereafter, when the MFP 51 is also detected as a Wi-Fi communication device (S125: YES), a determination is made that the device detected as the Wi-Fi communication device is also a WFD communication device (S725: YES). Accordingly, the WFD communication device image P2, which had been displayed first, is replaced by the Wi-Fi communication device image P1 (S740) (Refer to FIG. 7). This makes it possible for the CPU 106 to display the WFD communication device image P2 as the image denoting the MFP 51, and to replace the WFD communication device image P2 with the Wi-Fi communication device image P1 in accordance with having determined that the MFP 51 is also a Wi-Fi communication device. Therefore, the display of a plurality of images denoting the MFP 51 on the default device selection screen (Refer to FIG. 9) can be prevented regardless of the execution sequence of the determination as to whether a device is a WFD communication device and the determination as to whether the MFP 51 is a Wi-Fi communication device. Accordingly, it becomes possible to execute a proper display so as not to confuse the user.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications will be described below.

<Modifications>

There may be a variety of methods for determining whether or not a WFD communication device is also a Wi-Fi communication device in S325. For example, the CPU 106 may execute this determination by comparing the MAC addresses. Specifically, the CPU 106 may execute the determination in accordance with whether or not the MAC address acquired in S320 and the MAC address of the Wi-Fi communication device stored in the storage 109 are a match. The MAC address of the Wi-Fi communication device is information that is stored in the storage 109 in S220. Because a MAC address is a physical address that can uniquely identify an external device, and, in addition, is commonly used information, the MAC address makes it possible to reliably execute a determination process.

In S210 and S320, a configuration that acquires information from an external device is not limited to a configuration that uses MIB information. The configuration may be such that an external device replies with various information as a response to an information acquisition request from the information processing apparatus 100.

The condition for sending a Wi-Fi communication start instruction in S340 can be configured in a variety of ways. For example, the CPU 106 may send a Wi-Fi communication start instruction (S340) when it has been determined that a Wi-Fi/WFD communication device is able to execute a Wi-Fi communication (S330: YES), and a history of a Wi-Fi communication previously executed with the Wi-Fi/WFD communication device remains in the storage 109. This makes it possible to prevent an unnecessary Wi-Fi communication start instruction from being sent.

In S345, the present invention may also have a mode for receiving the IP address of a Wi-Fi/WFD communication device via a Wi-Fi communication.

When displaying an image denoting a Wi-Fi/WFD communication device on the default device selection screen SC1, the CPU 106 may display both the Wi-Fi communication device image P1 and the WFD communication device image P2 (S355, S740, and so forth). In this case, the Wi-Fi communication device image P1 may be displayed in a preferential manner over the WFD communication device image P2. A configuration for displaying the Wi-Fi communication device image P1 in a highlighted manner (e.g.: enlarged display, displayed in bold-face type, and so forth) can be cited as a specific example of a preferential display. A configuration for arranging the Wi-Fi communication device image P1 more toward the beginning side (e.g.: upper side) of a scroll-down screen than the WFD communication device image P2 can also be cited.

When displaying an image denoting a Wi-Fi/WFD communication device on the default device selection screen SC1, the CPU 106 may display inside the image both information denoting that the device is capable of a Wi-Fi communication (e.g.: IP address), and information denoting that the device is capable of a WFD communication (e.g.: device ID). The CPU 106 may also display inside the image information denoting that the Wi-Fi/WFD communication device communicates using a Wi-Fi communication.

In S350, the CPU 106 stores the information needed for executing a WFD communication (e.g.: device ID, MAC address) in the storage 109 even in a case where a Wi-Fi communication is executed with a Wi-Fi/WFD communication device. This makes it possible to switch over to a WFD communication using the device ID and MAC address in a case where a Wi-Fi communication is not able to be used with the Wi-Fi/WFD communication device. This enables the communication system to be provided with redundancy.

A plurality of default devices may be configured for each use. For example, there may be a first default device and a second default device. The application 121 may execute a communication with the first default device on a priority basis, and may communicate with the second default device when it is not possible to communicate with the first default device. Then, a Wi-Fi communication device may be registered in the default device table TB1 as the first default device, and a WFD communication device may be registered in the default device table TB1 as the second default device.

The process for determining whether or not a default device is within Wi-Fi communication range (S335) can be omitted. In this case, when the determination in S330 is affirmative, the processing may advance to S350. The process for sending a Wi-Fi communication start instruction (S340) can be omitted. In this case, when the determination is negative in S330, the processing may proceed to S370. From the above, generally speaking, The information processing apparatus 100 may comprise at least "receiving first communication device identification information", "receiving second communication device identification information", "displaying a first image", "displaying a second image", "accepting an operation for selecting the first image", "registering the first communication device", "accepting an operation for selecting the second image", and "registering the second communication device". As a specific example, the information processing apparatus 100 may execute at least S115, S120, S230, S375, S170 and S180.

The present invention is not limited to a configuration for registering a default device in the default device table TB1 in S170 and S180. For example, the user can register a default device by operating the touch panel 103 and inputting an IP address and the like.

The timing at which the application 121 acquires, from the OS 124, the SSID of the network with which the information processing apparatus 100 is currently connected is not limited to the timing of S315. For example, the SSID may be acquired at the timing at which a print preview is displayed, and/or at the timing at which the application 121 is started.

The value of the IP address and the character string of the SSID used in this embodiment are merely examples, and various values and character strings may be used.

Figure 9:
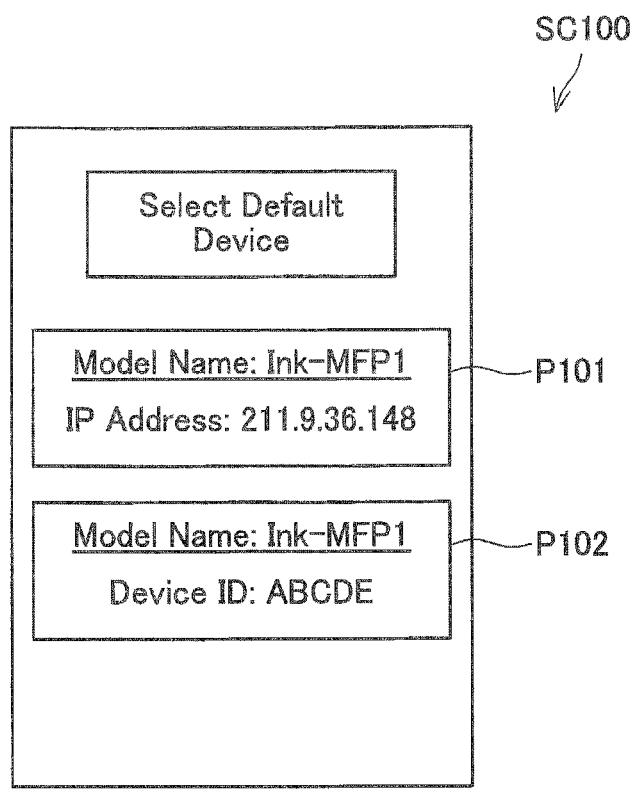
FIG. 9 shows a diagram showing an example of a default device selection screen display.

The display example of the display module 102 of FIG. 7 to FIG. 9 is merely an example. The display module 102 may also display images of various display modes.

The model name 801 may be anything so as long as they are able to differentiate the devices; for instance, they may be configured only from symbols without including numbers. Moreover, a name such as the device name capable of differentiating the devices may be used in substitute for the model name.

The information processing apparatus 100 may also be configured so that an external memory such as a memory card can be connected thereto. Furthermore, in substitute for the storage 109, a configuration of storing the various types of data in an external memory can be adopted.

While the MFP 51 was explained as an example of the image processing apparatus, the configuration is not limited thereto. The configuration may also adopt a sewing machine that performs stitching or quilting of a predetermined image based on instruction data. The configuration may also adopt a sewing machine that performs decorative stitching or sewing to form work pieces or products based on image data. The configuration may also adopt a 3D printer that generates 3D images via spraying or machining based on instruction data or the like. The configuration may also adopt work piece manufacturing equipment or product manufacturing equipment that forms work pieces or products via spraying or machining based on image data or the like. As an example of image data, 3D image data or 3D CAD data may be used. The configuration may also adopt a scanner that forms image data based on output data from a sensor which optically or electrically detects the profile of an object or based on output data from a sensor that is mounted on the object. The configuration may also adopt a scanner creates data indicating the shape or movement of an object based on the output from a sensor. As an example of image data, moving image data or 3D image data may be used.

Each program may be constituted by a single program module or by a plurality of program modules. Each example may adopt another replaceable configuration which is within the context of the present invention. Adoptable configurations include a computer (the CPU 106 or the like) which executes processing based on a program (the print & scan application 121 or the like), a computer which executes processing based on a program other than an image processing program such as an operating system and other applications, a hardware configuration (the touch screen 103 or the like) which operates according to an instruction by a computer, and a configuration in which a computer and a hardware configuration work in conjunction with each other. Obviously, adoptable configurations also include a computer which executes processing by coupling processing based on a plurality of programs, and a hardware configuration which operates according to an instruction by a computer which executes processing by coupling processing based on a plurality of programs.

What is claimed is:

1. A non-transitory computer-readable storage medium storing a computer program for an information processing device configured to communicate with a plurality of devices, wherein the information processing device comprises:
    a first wireless communication interface configured for communication in accordance with a first communication standard;
    a second wireless communication interface configured for communication in accordance with a second communication standard that is different from the first communication standard;
    a storage;
    a display unit;
    an operation unit; and
    one or more processors,
    wherein the computer program includes instructions for causing the one or more processors of the information processing device to perform:
    receiving, via the first wireless communication interface, first communication device identification information for identifying a first communication device that can be communicated using the first wireless communication interface;
    receiving, via the second wireless communication interface, second communication device identification information for identifying a second communication device that can be communicated using the second wireless communication interface;
    in response to receiving the second communication device identification information, waiting for a predetermined time period before displaying the second image on the display unit;
    receiving, via the first wireless communication interface from the first communication device, first physical address information for identifying the first communication device;
    storing, in the storage, the received first physical address information in association with the first communication device identification information;
    receiving, via the second wireless communication interface from the second communication device, second physical address information for identifying the second communication device:
    determining whether or not particular information has been received within the predetermined time period, based on whether or not the first physical device address information stored in the storage matches the received second physical address information,
    the particular information indicating that the second communication device identified by the received second communication device identification information can be communicated using the first wireless communication interface;
    displaying, on the display unit, a first image indicating the first communication device identified by the received first communication device identification information;
    displaying, on the display unit, a second image indicating the second communication device identified by the received second communication device identification information, wherein the displaying of the second image is performed only when it is determined in the determining that the particular information has not been received within the predetermined time period;
    accepting, via the operation unit, an operation for selecting the first image displayed on the display unit;
    registering, in the storage, the first communication device corresponding to the selected first image as a communication target device;
    accepting, via the operation unit, an operation for selecting the second image displayed on the display unit; and
    registering, in the storage, the second communication device corresponding to the selected second image as the communication target device.

2. The non-transitory computer-readable storage medium according to claim 1, wherein
    the first communication standard is a standard defining a communication method for communication between terminals via a relay device,
    the second communication standard is a standard defining a communication method for communication directly between one terminal and one or more other terminals functioning as relay devices, and the computer program including instructions for causing the one or more processors of the information processing device to further perform:
    receiving first relay device identification information for identifying a first relay device with which the first wireless communication interface connects;
    receiving, from the second communication device functioning as a second relay device, second relay device identification information for identifying the second relay device; and
    determining whether or not the particular information has been received, based on whether or not the first relay device identification information matches the second relay device identification information.

3. The non-transitory computer-readable storage medium according to claim 1, wherein
    the first wireless communication interface is an interface configured for communication with one or more devices in accordance with the first communication standard,
    the first image to be displayed on the display unit further includes information used for identifying the first communication device in communicating with the first communication device in accordance with the first communication standard,
    the second wireless communication interface is an interface configured for communication with one or more devices in accordance with the second communication standard, and
    the second image to be displayed on the display unit further includes information used for identifying the second communication device in communicating with the second communication device in accordance with the second communication standard.

4. The non-transitory computer-readable storage medium according to claim 1, wherein
    the first wireless communication interface is given priority over the second wireless communication interface.

5. The non-transitory computer-readable storage medium according to claim 1, wherein
    the displaying of the second image is performed in a case that the first communication device identification information functioning as the particular information is not received.

6. An information processing device comprising:
a first wireless communication interface configured for communication in accordance with a first communication standard;
a second wireless communication interface configured for communication in accordance with a second communication standard that is different from the first communication standard;
a storage;
a display unit;
an operation unit; and
a control device configured to perform:
    receiving, via the first wireless communication interface, first communication device identification information for identifying a first communication device that can be communicated using the first wireless communication interface;
    receiving, via the second wireless communication interface, second communication device identification information for identifying a second communication device that can be communicated using the second wireless communication interface;
    in response to receiving the second communication device identification information, waiting for a predetermined time period before displaying the second image on the display unit;
    receiving, via the first wireless communication interface from the first communication device, first physical address information for identifying the first communication device;
    storing, in the storage, the received first physical address information in association with the first communication device identification information;
    receiving, via the second wireless communication interface from the second communication device, second physical address information for identifying the second communication device;
    determining whether or not particular information has been received within the predetermined time period, based on whether or not the first physical device address information stored in the storage matches the received second physical address information,
the particular information indicating that the second communication device identified by the received second communication device identification information can be communicated using the first wireless communication interface;
    displaying, on the display unit, a first image indicating the first communication device identified by the received first communication device identification information;
    displaying, on the display unit, a second image indicating the second communication device identified by the received second communication device identification information, wherein the displaying of the second image is performed only when it is determined in the determining that the particular information has not been received within the predetermined time period;
    accepting, via the operation unit, an operation for selecting the first image displayed on the display unit;
    registering, in the storage, the first communication device corresponding to the selected first image as a communication target device;
    accepting, via the operation unit, an operation for selecting the second image displayed on the display unit; and
    registering, in the storage, the second communication device corresponding to the selected second image as the communication target device.

7. A non-transitory computer-readable storage medium storing a computer program for an information processing device configured to communicate with a plurality of devices, wherein
the information processing device comprises:
    a first wireless communication interface configured for communication in accordance with a first communication standard;
    a second wireless communication interface configured for communication in accordance with a second communication standard that is different from the first communication standard;
    a storage;
    a display unit;
    an operation unit; and
    one or more processors, wherein the computer program includes instructions for causing the one or more processors of the information processing device to perform:

receiving, via the first wireless communication interface, first communication device identification information for identifying a first communication device that can be communicated using the first wireless communication interface;

receiving, via the second wireless communication interface, second communication device identification information for identifying a second communication device that can be communicated using the second wireless communication interface;

transmitting inquiry information, via the second wireless communication interface, to the second communication device identified by the received second communication device identification information, in a case that the second communication device identification information has been received;

receiving, via the second wireless communication interface, response information as a response to the transmitted inquiry information, the response information indicating that the identified second communication device is capable of communicating in accordance with the first communication standard;

displaying, on the display unit, a first image indicating the first communication device identified by the received first communication device identification information;

displaying, on the display unit, a second image indicating the second communication device identified by the received second communication device identification information, wherein the displaying of the second image is performed only in a case that particular information has not been received and the response information was not received, the particular information indicating that the second communication device identified by the received second communication device identification information can be communicated using the first wireless communication interface;

accepting, via the operation unit, an operation for selecting the first image displayed on the display unit;

registering, in the storage, the first communication device corresponding to the selected first image as a communication target device;

accepting, via the operation unit, an operation for selecting the second image displayed on the display unit; and registering, in the storage, the second communication device corresponding to the selected second image as the communication target device.

8. The non-transitory computer-readable storage medium according to claim 7, wherein
the displaying of the second image includes:
in response to receiving the second communication device identification information, waiting for a predetermined time period before displaying the second image on the display unit; and
displaying the second image on the display unit only in a case that the particular information was not received within the predetermined time period.

9. The non-transitory computer-readable storage medium according to claim 7, wherein
the first communication standard is a standard defining a communication method for communication between terminals via a relay device,
the second communication standard is a standard defining a communication method for communication directly between one terminal and one or more other terminals functioning as relay devices, and
the computer program including instructions for causing the one or more processors of the information processing device to further perform:
receiving first relay device identification information for identifying a first relay device with which the first wireless communication interface connects;
receiving, from the second communication device functioning as a second relay device, second relay device identification information for identifying the second relay device; and
determining whether or not the particular information has been received, based on whether or not the first relay device identification information matches the second relay device identification information.

10. The non-transitory computer-readable storage medium according to claim 7, wherein
the computer program includes instructions for causing the one or more processors of the information processing device to further perform:
receiving, via the second wireless communication interface, state information indicating that the second communication device is not in the state of being capable of communicating in accordance with the first communication standard; and
transmitting instruction information via the second wireless communication interface to the second communication device in a case that the response information and the state information are received, the instruction information instructing the second communication device to shift to the state of being capable of communicating in accordance with the first communication standard,
wherein the displaying of the second image is performed only in a case that the particular information was not received after having transmitted the instruction information.

11. A non-transitory computer-readable storage medium storing a computer program for an information processing device configured to communicate with a plurality of devices, wherein
the information processing device comprises:
a first wireless communication interface configured for communication in accordance with a first communication standard;
a second wireless communication interface configured for communication in accordance with a second communication standard that is different from the first communication standard;
a storage;
a display unit;
an operation unit; and
one or more processors,
wherein the computer program includes instructions for causing the one or more processors of the information processing device to perform:
receiving, via the first wireless communication interface, first communication device identification information for identifying a first communication device that can be communicated using the first wireless communication interface;
receiving, via the second wireless communication interface, second communication device identification information for identifying a second communication device that can be communicated using the second wireless communication interface;

displaying, on the display unit, a first image indicating the first communication device identified by the received first communication device identification information;

displaying, on the display unit, a second image indicating the second communication device identified by the received second communication device identification information, wherein the displaying of the second image is performed only in a case that particular information has not been received, the particular information indicating that the second communication device identified by the received second communication device identification information can be communicated using the first wireless communication interface;

accepting, via the operation unit, an operation for selecting the first image displayed on the display unit;

registering, in the storage, the first communication device corresponding to the selected first image as a communication target device;

accepting, via the operation unit, an operation for selecting the second image displayed on the display unit; and registering, in the storage, the second communication device corresponding to the selected second image as the communication target device, wherein the displaying of the second image is started when the second communication device identification information is received, and the displaying of the second image is terminated when the particular information is received.

12. The non-transitory computer-readable storage medium according to claim 11, wherein the displaying of the second image includes:
in response to receiving the second communication device identification information, waiting for a predetermined time period before displaying the second image on the display unit; and
displaying the second image on the display unit only in a case that the particular information was not received within the predetermined time period.

13. The non-transitory computer-readable storage medium according to claim 11, wherein the first communication standard is a standard defining a communication method for communication between terminals via a relay device, the second communication standard is a standard defining a communication method for communication directly between one terminal and one or more other terminals functioning as relay devices, and the computer program including instructions for causing the one or more processors of the information processing device to further perform:
receiving first relay device identification information for identifying a first relay device with which the first wireless communication interface connects;
receiving, from the second communication device functioning as a second relay device, second relay device identification information for identifying the second relay device; and
determining whether or not the particular information has been received, based on whether or not the first relay device identification information matches the second relay device identification information.

14. An information processing device comprising:

a first wireless communication interface configured for communication in accordance with a first communication standard;

a second wireless communication interface configured for communication in accordance with a second communication standard that is different from the first communication standard;

a storage;

a display unit;

an operation unit; and a control device configured to perform:
receiving, via the first wireless communication interface, first communication device identification information for identifying a first communication device that can be communicated using the first wireless communication interface;
receiving, via the second wireless communication interface, second communication device identification information for identifying a second communication device that can be communicated using the second wireless communication interface;
transmitting inquiry information, via the second wireless communication interface, to the second communication device identified by the received second communication device identification information, in a case that the second communication device identification information has been received;
receiving, via the second wireless communication interface, response information as a response to the transmitted inquiry information, the response information indicating that the identified second communication device is capable of communicating in accordance with the first communication standard;
displaying, on the display unit, a first image indicating the first communication device identified by the received first communication device identification information;
displaying, on the display unit, a second image indicating the second communication device identified by the received second communication device identification information, wherein the displaying of the second image is performed only in a case that particular information has not been received and the response information was not received, the particular information indicating that the second communication device identified by the received second communication device identification information can be communicated using the first wireless communication interface;
accepting, via the operation unit, an operation for selecting the first image displayed on the display unit;
registering, in the storage, the first communication device corresponding to the selected first image as a communication target device;
accepting, via the operation unit, an operation for selecting the second image displayed on the display unit; and
registering, in the storage, the second communication device corresponding to the selected second image as the communication target device.

15. The information processing device according to claim 14, wherein the displaying of the second image includes:
in response to receiving the second communication device identification information, waiting for a predetermined time period before displaying the second image on the display unit; and displaying the second image on the display unit only in a case that the particular information was not received within the predetermined time period.

16. The information processing device according to claim 14, wherein
the first communication standard is a standard defining a communication method for communication between terminals via a relay device,
the second communication standard is a standard defining a communication method for communication directly between one terminal and one or more other terminals functioning as relay devices, and
the control device is configured to further perform:
receiving first relay device identification information for identifying a first relay device with which the first wireless communication interface connects;
receiving, from the second communication device functioning as a second relay device, second relay device identification information for identifying the second relay device; and
determining whether or not the particular information has been received, based on whether or not the first relay device identification information matches the second relay device identification information.

17. The information processing device according to claim 14, wherein
the control device is configured to further perform:
receiving, via the second wireless communication interface, state information indicating that the second communication device is not in the state of being capable of communicating in accordance with the first communication standard; and
transmitting instruction information via the second wireless communication interface to the second communication device in a case that the response information and the state information are received, the instruction information instructing the second communication device to shift to the state of being capable of communicating in accordance with the first communication standard,
wherein the displaying of the second image is performed only in a case that the particular information was not received after having transmitted the instruction information.

18. An information processing device comprising:
a first wireless communication interface configured for communication in accordance with a first communication standard;
a second wireless communication interface configured for communication in accordance with a second communication standard that is different from the first communication standard;
a storage;
a display unit;
an operation unit; and
a control device configured to perform:
receiving, via the first wireless communication interface, first communication device identification information for identifying a first communication device that can be communicated using the first wireless communication interface;
receiving, via the second wireless communication interface, second communication device identification information for identifying a second communication device that can be communicated using the second wireless communication interface;
displaying, on the display unit, a first image indicating the first communication device identified by the received first communication device identification information;
displaying, on the display unit, a second image indicating the second communication device identified by the received second communication device identification information, wherein the displaying of the second image is performed only in a case that particular information has not been received, the particular information indicating that the second communication device identified by the received second communication device identification information can be communicated using the first wireless communication interface;
accepting, via the operation unit, an operation for selecting the first image displayed on the display unit;
registering, in the storage, the first communication device corresponding to the selected first image as a communication target device;
accepting, via the operation unit, an operation for selecting the second image displayed on the display unit; and
registering, in the storage, the second communication device corresponding to the selected second image as the communication target device,
wherein the displaying of the second image is started when the second communication device identification information is received, and
the displaying of the second image is terminated when the particular information is received.

19. The information processing device according to claim 18, wherein
the displaying of the second image includes:
in response to receiving the second communication device identification information, waiting for a predetermined time period before displaying the second image on the display unit; and
displaying the second image on the display unit only in a case that the particular information was not received within the predetermined time period.

20. The information processing device according to claim 18, wherein
the first communication standard is a standard defining a communication method for communication between terminals via a relay device,
the second communication standard is a standard defining a communication method for communication directly between one terminal and one or more other terminals functioning as relay devices, and
the control device is configured to further perform:
receiving first relay device identification information for identifying a first relay device with which the first wireless communication interface connects;
receiving, from the second communication device functioning as a second relay device, second relay device identification information for identifying the second relay device; and
determining whether or not the particular information has been received, based on whether or not the first relay device identification information matches the second relay device identification information.

* * * * *